(12) United States Patent
Kramer

(10) Patent No.: US 7,786,214 B2
(45) Date of Patent: Aug. 31, 2010

(54) COMPOSITION OF EPOXY RESIN, EPOXY ADDUCT, UREA DERIVATIVE THIXOTROPIC AGENT AND CURING AGENT

(75) Inventor: Andreas Kramer, Zurich (CH)

(73) Assignee: Sika Technology AG, Baar (CH)

( * ) Notice: Subject to any disclaimer, the term of this patent is extended or adjusted under 35 U.S.C. 154(b) by 199 days.

(21) Appl. No.: 11/976,991

(22) Filed: Oct. 30, 2007

(65) Prior Publication Data

US 2008/0073029 A1 Mar. 27, 2008

Related U.S. Application Data

(63) Continuation of application No. 10/513,295, filed as application No. PCT/EP03/03962 on Apr. 16, 2003, now abandoned.

(30) Foreign Application Priority Data

May 3, 2002 (EP) .................................. 02009923

(51) Int. Cl.
*C08K 3/22* (2006.01)
*C08K 3/40* (2006.01)
*C08L 63/02* (2006.01)
*C08L 63/10* (2006.01)
*C09J 163/02* (2006.01)

(52) U.S. Cl. .................. 525/65; 156/330; 523/457; 523/466; 523/467; 525/454

(58) Field of Classification Search .................. None

See application file for complete search history.

(56) References Cited

U.S. PATENT DOCUMENTS

| | | | |
|---|---|---|---|
| 3,148,167 A | 9/1964 | Keplinger, Jr. | |
| 3,505,283 A | 4/1970 | Dalhuisen | |
| 3,533,983 A | 10/1970 | Hirosawa | |
| 4,383,068 A * | 5/1983 | Brandt | 524/196 |
| 4,486,556 A | 12/1984 | Kordomenos et al. | |
| 4,952,645 A | 8/1990 | Mulhaupt et al. | |
| 5,073,601 A | 12/1991 | Müulhaupt et al. | |
| 5,079,094 A | 1/1992 | Kimball | |
| 5,151,327 A * | 9/1992 | Nishiyama et al. | 428/343 |
| 5,189,081 A * | 2/1993 | Akutagawa et al. | 523/428 |
| 5,274,006 A * | 12/1993 | Kagoshima et al. | 521/85 |
| 5,278,257 A | 1/1994 | Mulhaupt et al. | |
| 5,290,857 A | 3/1994 | Ashida et al. | |
| 5,350,825 A | 9/1994 | König et al. | |
| 5,484,853 A | 1/1996 | Chen et al. | |
| 5,668,227 A | 9/1997 | Wolleb et al. | |
| 5,686,509 A | 11/1997 | Nakayama et al. | |
| 5,707,439 A | 1/1998 | Takekoshi et al. | |
| 5,908,911 A | 6/1999 | Nakashio et al. | |
| 6,077,884 A | 6/2000 | Hess et al. | |
| 6,153,709 A | 11/2000 | Xiao et al. | |
| 6,197,849 B1 | 3/2001 | Zilg et al. | |
| 6,207,733 B1 | 3/2001 | Feola et al. | |
| 6,248,204 B1 | 6/2001 | Schuft | |
| 6,322,890 B1 | 11/2001 | Barron et al. | |
| 6,548,593 B2 | 4/2003 | Merz et al. | |
| 6,649,706 B1 | 11/2003 | Heid et al. | |
| 6,723,803 B1 * | 4/2004 | Hermansen et al. | 525/533 |
| 6,740,192 B1 | 5/2004 | Lu et al. | |
| 6,776,869 B1 | 8/2004 | Schenkel | |
| 6,903,180 B2 | 6/2005 | Kaji et al. | |
| 2002/0007003 A1 | 1/2002 | Merz et al. | |
| 2003/0105266 A1 | 6/2003 | Suga | |
| 2007/0066721 A1 | 3/2007 | Kramer et al. | |
| 2007/0105983 A1 | 5/2007 | Kramer et al. | |
| 2008/0073029 A1 | 3/2008 | Kramer | |

FOREIGN PATENT DOCUMENTS

| | | |
|---|---|---|
| CA | 1334700 | 3/1995 |
| DE | 197 51 143 A1 | 5/1998 |
| DE | 198 58 921 A1 | 6/2000 |
| DE | 199 24 170 A1 | 11/2000 |
| EP | 3 307 666 A1 | 3/1989 |
| EP | 0 338 985 A2 | 10/1989 |
| EP | 0 338 995 A1 | 10/1989 |
| EP | 0 343 686 A1 | 11/1989 |
| EP | 0 353 190 B1 | 1/1990 |
| EP | 0 600 314 A1 | 6/1994 |
| EP | 0 343 676 A1 | 5/1995 |
| EP | 0 781 790 A1 | 7/1997 |
| EP | 1 152 019 A1 | 11/2001 |
| EP | 1 359 202 A1 | 11/2003 |
| EP | 1 431 325 A1 | 6/2004 |
| EP | 1 498 441 A1 | 1/2005 |

(Continued)

OTHER PUBLICATIONS

Derwent accession No. 2001-062546 for German Patent No. 19,924,170 and U.S. Patent No. 6,649,706, Heid et al., Nov. 30, 2000, one page.
Derwent accession No. 2002-124066 for European Patent No. 1,152,019 and U.S. Patent No. 6,548,593, Merz et al., Nov. 7, 2001, one page.

*Primary Examiner*—Robert Sellers
(74) *Attorney, Agent, or Firm*—Oliff & Berridge, PLC

(57) ABSTRACT

Disclosed are compositions containing at least one epoxy resin A with on average more than one epoxy group per molecule; at least one epoxy adduct B with on average one epoxy group per molecule; at least one thixotropic agent C, based on a urea derivative in a non-diffusing support material; and at least one curing agent D for epoxy resins, which is activated by an increased temperature. Also disclosed are compositions containing at least one core-shell polymer E and/or filler F and/or reactive diluent G.

29 Claims, No Drawings

FOREIGN PATENT DOCUMENTS

| | | |
|---|---|---|
| GB | 1 326 669 | 8/1973 |
| GB | 2 314 085 A | 12/1997 |
| JP | 2000-212504 A * | 8/2000 |
| WO | WO 00/37520 A1 | 6/2000 |
| WO | WO 00/37554 A1 | 6/2000 |
| WO | WO 01/23466 A1 | 4/2001 |
| WO | WO 02/48235 A1 | 6/2002 |
| WO | WO 03/093387 A1 | 11/2003 |
| WO | WO 2004/055092 A1 | 7/2004 |
| WO | WO 2005/007720 A1 | 1/2005 |
| WO | WO 2005/007766 A1 | 1/2005 |

* cited by examiner

COMPOSITION OF EPOXY RESIN, EPOXY ADDUCT, UREA DERIVATIVE THIXOTROPIC AGENT AND CURING AGENT

This is a Continuation of application Ser. No. 10/513,295 filed Dec. 2, 2004, which is a National Phase of Application No. PCT/EP03/03962, filed Apr. 16, 2003 now abandoned. The entire disclosure of the prior application is hereby incorporated by reference in its entirety.

BACKGROUND

The invention relates to heat-cured compositions which are distinguished by both high impact strength and a high glass transition temperature at the same time, and which in particular can be used as one-component adhesives.

High-quality adhesives are increasingly used in manufacture of both vehicles and mounted parts or machinery and equipment, either instead of or in combination with conventional joining methods such as riveting and punching or welding. This results in advantages and new options for manufacturing, for example manufacture of composite and hybrid materials, or greater freedom in designing components. For use in vehicle manufacture, adhesives must have good adhesion to all substrates used, in particular electrogalvanized, hot-dip galvanized, and subsequently phosphatized sheet steel, lubricated sheet steel, as well as various types of aluminum. These good adhesion properties must also be maintained in particular after aging (alternating climate, salt spray bath, etc.) with no major loss in quality. If the adhesives are used as bodyshell adhesives, then the wash resistance of this adhesive is of considerable importance in order to assure process reliability at the manufacturer's facilities.

Wash resistance can be achieved with or without pregelling. To achieve sufficient wash resistance, the adhesive can be pasty and pregelled in a bodyshell oven within a short time or via induction heating of the parts to be joined.

Bodyshell adhesives must be cured under conventional baking conditions, ideally for 30 minutes at 180° C. Furthermore, they must also be stable up to about 220° C. Other requirements for such a cured adhesive or the bond are that operational reliability is ensured both at high temperatures up to about 85° C. and at low temperatures down to about −40° C. Since these adhesives are structural adhesives and thus these adhesives bond structural parts, high strength of the adhesive is of utmost importance.

Conventional epoxy adhesives are distinguished by high mechanical strength, in particular high tensile strength and high tensile shear strength. When the bond is 40° C. Since these adhesives are structural adhesives and thus these adhesives bond structural parts, high strength of the adhesive is of utmost importance.

Conventional epoxy adhesives are distinguished by high mechanical strength, in particular high tensile strength and high tensile shear strength. When the bond is subjected to impact loading, however, conventional epoxy adhesives are usually too brittle; and so under crash conditions, when both high tensile and high peel stresses occur, they are far from able to meet the requirements of the automobile industry in particular. They also have insufficient strengths at high temperatures and in particular at low temperatures.

Various approaches have been suggested to reduce the brittleness of epoxy adhesives under impact loading. Essentially two methods have been suggested in the literature for improving the impact strength of epoxy adhesives. First, the goal can be achieved by addition of at least partially crosslinked high molecular weight compounds such as latexes of core/shell polymers or other flexibilizing polymers and copolymers. Secondly, some increase in strength can also be achieved by introducing soft segments, e.g., by appropriate modification of the epoxy components.

According to the first method mentioned above, U.S. Pat. No. 5,290,857 and U.S. Pat. No. 5,686,509 describe how epoxy resins can be made impact resistant by mixing a fine powdered core/shell polymer into the epoxy matrix. This results in formation of highly elastic domains in the hard brittle epoxy matrix, which increase the impact strength. U.S. Pat. No. 5,290,857 describes such core/shell polymers based on acrylate or methacrylate polymers. U.S. Pat. No. 5,686,509 describes similar compositions based on ionically crosslinked polymer particles, where the core polymer consists of crosslinked diene monomers and the shell copolymer consists of crosslinked acrylic acid, methacrylic acid, and unsaturated carboxylic acid monomers.

According to the second method mentioned above, the U.S. Pat. No. 4,952,645 describes epoxy resin compositions which were flexibilized by reaction with aliphatic, cycloaliphatic, or aromatic carboxylic acids, in particular dimeric or trimeric fatty acids, as well as with aliphatic or cycloaliphatic diols. Such compositions should be distinguished by increased flexibility, in particular at low temperatures.

Modification of epoxy adhesives by means of polyurethane/epoxy adducts is also known. In this case, the terminal isocyanate groups of the prepolymers are reacted with at least one epoxy resin, where a hot-melt adhesive is obtained that is solid at room temperature. This method is described in EP 0 343 676.

It is also known that epoxy resins can be flexibilized with elastomers such as synthetic rubbers and their derivatives. The major effect in this case is based on the only partial miscibility of epoxy resins and the corresponding derivatized synthetic rubbers, where as a result heterodisperse phases are formed during the manufacturing process that have an effect comparable to the effect of core/shell polymers. Establishment of this superstructure depends on both the quantitative composition and on process control during the cure process. In the literature known to the person skilled in the art, carboxyl-terminated polybutadiene/acrylonitrile copolymers, which are reacted with epoxy resins, are described as particularly preferred starting compounds for this flexibilizing method. U.S. Pat. No. 5,278,257 and WO 0 037 554 describe epoxy adhesive formulations which contain as major components adducts with epoxy end groups, produced by reaction of carboxyl-terminated butadiene/acrylonitrile or butadiene/methacrylate compounds (or their styrene copolymers) with epoxy resins, as well as phenol-terminated polyurethanes or polyureas. Such adhesives can have high parameter values under peel, impact, or impact/peel loading.

A considerable drawback of the prior art is generally that by increasing the impact strength, the glass transition temperature and/or the strength of the adhesive is reduced; or that by raising the glass transition temperature, the strength is indeed increased as a rule but the impact strength, as well as the adhesion and especially the peel strength, is reduced. This situation severely limits use as a structural bodyshell adhesive, in particular because extremely high demands are made on a crash-resistant adhesive.

Additionally, the use of liquid rubbers is quite disadvantageous, since it means that the extent of phase separation and thus also the improvement of impact strength depends very much on the manufacturing or cure conditions, leading to considerable variations in the properties.

SUMMARY

The aim of this invention is to provide novel one-component heat-cured compositions, in particular adhesives and hot-melt adhesives, that are stable at room temperature and that on the one hand have high strength and on the other hand have a high glass transition temperature, advantageously a glass transition temperature of at least 85° C. This is achieved in particular without use of liquid rubbers and without the dependences on the manufacturing or cure conditions that are associated with such use.

These properties are particularly important in order to ensure a bond even in the case of an accident (a crash) and to thereby meet modern safety requirements for vehicle construction.

This goal could surprisingly be achieved by the composition according to the invention as specified by claim 1. In particular, it was unexpectedly shown that, particularly by using a thixotropic agent based on urea derivatives in a non-diffusing carrier which is described in patent application EP 1 152 019 A1, a very considerable improvement in impact strength can be achieved. It was also unexpected that the epoxy adduct used in claim 1, optimized with respect to glass transition temperature, did not cause the expected decrease in impact strength.

This invention relates to compositions which contain at least one epoxy resin A with more than one epoxy group per molecule on the average; at least one epoxy adduct B with more than one epoxy group per molecule on the average; at least one thixotropic agent C based on a urea derivative in a non-diffusing carrier; and at least one curing agent D for epoxy resins which is activated by elevated temperature.

According to preferred embodiments, compositions are also described that in addition contain at least one core/shell polymer E and/or at least one filler F and/or at least one reactive diluent G.

The use of this composition as a one-component adhesive as well as a process for manufacture of the composition are also described.

In addition, the use of the thixotropic agent C based on a urea derivative in a non-diffusing carrier as a means to increase impact strength is described.

DETAILED DESCRIPTION OF EMBODIMENTS

This invention relates to compositions which contain at least one epoxy resin A with more than one epoxy group per molecule on the average; at least one epoxy adduct B with more than one epoxy group per molecule on the average; at least one thixotropic agent C based on a urea derivative in a non-diffusing carrier; and at least one curing agent D for epoxy resins which is activated by elevated temperature.

The epoxy resin A has more than one epoxy group per molecule on the average. 2, 3, or 4 epoxy groups per molecule are preferred. Epoxy resin A is preferably a liquid resin, in particular diglycidyl ether of bisphenol-A (DGEBA), diglycidyl ether of bisphenol-F, as well as diglycidyl ether of bisphenol-A/F (the designation "A/F" here refers to a mixture of acetone and formaldehyde used as the starting material in its manufacture). Because of the manufacturing process for these resins, clearly higher molecular weight components are also contained in the liquid resins. Such liquid resins are available, for example, as Araldite GY 250, Araldite PY 304, Araldite GY 282 (Vantico), or D.E.R. 331 (Dow).

The epoxy adduct B is an epoxy adduct of type B1 and optionally B2.

The epoxy adduct B1 can be obtained by reaction of at least one dicarboxylic acid, preferably at least one dimeric fatty acid, in particular at least one dimeric C4-C20 fatty acid (corresponding to a C8-C40 dicarboxylic acid) with at least one diglycidyl ether, in particular bisphenol-A diglycidyl ether, bisphenol-F diglycidyl ether, or bisphenol-A/F diglycidyl ether. The epoxy adduct B1 has a flexibilizing character.

The epoxy adduct B2 can be obtained by reaction of at least one bis(aminophenyl)sulfone isomer or at least one aromatic alcohol with at least one diglycidyl ether. The aromatic alcohol is preferably selected from the group of 2,2-bis(4-hydroxyphenyl)propane (=bisphenol-A), bis(4-hydroxyphenyl)methane (=bisphenol-F), bis(4-hydroxyphenyl)sulfone, hydroquinone, resorcinol, pyrocatechol, naphthohydroquinone, naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, as well as all isomers of the aforementioned compounds. The preferred bis(aminophenyl) sulfone isomers are bis(4-aminophenyl)sulfone and bis(3-aminophenyl)sulfone. The diglycidyl ether is in particular bisphenol-A diglycidyl ether, bisphenol-F diglycidyl ether, or bisphenol-A/F diglycidyl ether. Bis(4-hydroxyphenyl)sulfone is suitable as a particularly preferred aromatic alcohol. The epoxy adduct B2 has a rather rigid structure.

In a particularly preferred embodiment, epoxy adduct B is a combination of epoxy adduct B1 and epoxy adduct B2.

Epoxy adduct B preferably has a molecular weight of 700-6000 g/mol, preferably 900-4000 g/mol, in particular 1000-3300 g/mol. Here and in the following, by "molecular weight" we mean the mean molecular weight $M_W$.

The epoxy adduct B is prepared in a way known to the person skilled in the art.

The total proportion of epoxy resin A is advantageously 12-50 wt. %, preferably 17-45 wt. %, based on the sum of the weights A+B.

Here and in the following, by "total proportion" in each case we mean the sum of all the components belonging to the given category. For example, if a composition contains 2 epoxy resins A, then the total proportion is the sum of these two epoxy resins.

Additionally, the total proportion of epoxy resin A and epoxy adduct B together is advantageously 20-70 wt. %, preferably 35-65 wt. %, based on the weight of the total composition. The person skilled in the art can use a known catalyst for synthesis of the epoxy adduct, such as for example triphenylphosphine.

In addition, the composition contains at least one thixotropic agent C, based on a urea derivative in a non-diffusing carrier. This thixotropic agent C advantageously contains a blocked polyurethane prepolymer as a carrier. Preparation of such urea derivatives and carrier materials is described in detail in the patent application EP 1 152 019 A1.

The urea derivative is a product of reaction between an aromatic monomeric diisocyanate and an aliphatic amine compound. It is also quite possible to react several different monomeric diisocyanates with one or more aliphatic amine compounds, or to react one monomeric diisocyanate with several aliphatic amine compounds. The reaction product of 4,4'-diphenylmethylene diisocyanate (MDI) and butylamine has proven to be particularly advantageous.

The total proportion of thixotropic agent C is advantageously 5-40 wt. %, preferably 10-25 wt. %, based on the weight of the total composition. The proportion of the urea derivative is advantageously 5-50 wt. %, preferably 15-30 wt. %, based on the weight of the thixotropic agent C.

The composition according to the invention additionally contains at least one curing agent D for epoxy resins which is activated at elevated temperature. Here the curing agent is preferably selected from the group of dicyanodiamide, guanamine, guanidine, aminoguanidine, and derivatives thereof. In addition, substituted ureas such as phenyl dimethylureas, in particular p-chlorophenyl-N,N-dimethylurea (monuron), 3-phenyl-1,1-dimethylurea (fenuron), or 3,4-dichlorophenyl-N,N-dimethylurea (diuron) are catalytically effective. Compounds in the class of imidazole and amine complexes can also be used. Dicyanodiamide is particularly preferred.

The total proportion of curing agent D is advantageously 1-6 wt. %, preferably 2-4 wt. %, based on the weight of the total composition.

In another embodiment, the composition according to the invention contains in addition at least one core/shell polymer E. The core of the core/shell polymer preferably consists of a polymer with a glass transition temperature of −30° C. or lower, and the shell of the core/shell polymer preferably consists of a polymer with a glass transition temperature of 70° C. or higher. Examples of polymers that can be used as the core material are polybutadiene, polyacrylic acid ester, and polymethacrylic acid ester as well as their copolymers or terpolymers with polystyrene, polyacrylonitrile, or polysulfide. The core material preferably contains polybutadiene or polybutylacrylate. Examples of shell polymers are polystyrene, polyacrylonitrile, polyacrylate and polymethacrylate monomers, copolymers, or terpolymers, or styrene/acrylonitrile/glycidyl methacrylate terpolymers. Polymethylmethacrylate is preferably used as the polymer for the shells. The particle size of such core/shell polymers is appropriately 0.05-30 µm, preferably 0.05-15 µm. Core/shell polymers of particle size smaller than 3 µm are used in particular. Core/shell polymers are preferably used that contain a core of polybutadiene or polybutadiene/polystyrene. This core material is preferably partially crosslinked. Other core materials are polyacrylates and polymethacrylates, in particular polyacrylic acid ester and polymethacrylic acid ester as well as their copolymers or terpolymers.

The shells preferably consist of polymers based on methylmethacrylate, methacrylic acid cyclohexyl ester, acrylic acid butyl ester, styrene, or methacrylonitrile.

Commercially available core/shell polymer products are, for example, F-351 (Zeon Chemicals), Paraloid and Acryloid (Röhm and Haas), Blendex (GE Specialty Chemicals), and the like.

The total proportion of the core/shell polymer E is advantageously 3-20 wt. %, preferably 5-12 wt. %, based on the weight of the total composition.

In a preferred embodiment, the composition in addition contains at least one filler F. Here the filler is preferably mica, talc, kaolin, wollastonite, feldspar, chlorite, bentonite, montmorillonite, calcium carbonate (precipitated or ground), dolomite, quartz, silicic acids (pyrogenic or precipitated), cristobalite, calcium oxide, aluminum hydroxide, magnesium oxide, hollow ceramic spheres, hollow glass spheres, hollow organic spheres, glass spheres, colored pigments. As the filler F, we mean both organic coated and uncoated commercially available forms known to the person skilled in the art.

The total proportion of total filler F is advantageously 5-30 wt. %, preferably 10-25 wt. %, based on the weight of the total composition.

In another preferred embodiment, the composition in addition contains at least one reactive diluent G with epoxy groups. This reactive diluent G is in particular:

Glycidyl ether of monofunctional saturated or unsaturated, branched or unbranched, cyclic or open-chain C4-C30 alcohols, e.g. butyl glycidyl ether, hexyl glycidyl ether, 2-ethylhexyl glycidyl ether, allyl glycidyl ether, tetrahydrofurfuryl glycidyl ether, and furfuryl glycidyl ether, etc.

Glycidyl ether of difunctional saturated or unsaturated, branched or unbranched, cyclic or open-chain C2-C30 alcohols, e.g. ethylene glycol diglycidyl ether, butanediol diglycidyl ether, hexanediol diglycidyl ether, octanediol diglycidyl ether, cyclohexane dimethanol diglycidyl ether, neopentyl glycol diglycidyl ether, etc.

Glycidyl ether of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ether of aliphatic polyols such as sorbitol, etc.

Glycidyl ether of phenol compounds and aniline compounds such as phenyl glycidyl ether, cresyl glycidyl ether, p-tert-butyl phenyl glycidyl ether, nonylphenyl glycidyl ether, 3-n-pentadecenyl glycidyl ether (from cashew nut shell oil), N,N-diglycidyl aniline, etc.

Epoxidized tertiary amines such as N,N-diglycidyl cyclohexylamine, etc.

Epoxidized monocarboxylic acids or dicarboxylic acids such as neodecanoic acid glycidyl ester, methacrylic acid glycidyl ester, benzoic acid glycidyl ester, phthalic acid diglycidyl ester, tetrahydrophthalic acid diglycidyl ester and hexahydrophthalic acid diglycidyl ester, diglycidyl ester of dimeric fatty acids, etc.

Epoxidized difunctional or trifunctional, low molecular weight or high molecular weight polyether polyols such as polyethylene glycol diglycidyl ether, polypropylene glycol diglycidyl ether, etc.

Hexanediol diglycidyl ether, polypropylene glycol diglycidyl ether, and polyethylene glycol diglycidyl ether are particularly preferred.

The total proportion of reactive diluent G with epoxy groups is advantageously 1-7 wt. %, preferably 2-6 wt. %, based on the weight of the total composition.

Use of the composition as one-component adhesives has proven to be particularly successful. Heat-cured one-component adhesives can be prepared this way that in particular are distinguished by both high impact strength and also a high glass transition temperature. Such adhesives are needed for bonding heat-stable materials. By heat-stable materials we mean materials that, for a cure temperature of 120° C.-220° C., preferably 150° C.-200° C., are shape-stable at least during the cure time. Here the heat-stable materials are metals and plastics such as ABS, polyamide, polyphenylene ether, composite materials such as SMC, glass fiber reinforced unsaturated polyesters, epoxy or acrylate composites. A preferred use is when at least one material is a metal. A particularly preferred use is bonding of identical or different metals, in particular in bodyshells in the automobile industry. Preferred metals are especially steel, in particular electrogalvanized steel, hot-dip galvanized steel, lubricated steel, and subsequently phosphatized steel as well as aluminum, in particular the types commonly used in automobile construction.

The desired combination of high crash strength and high operating temperature can especially be achieved with an adhesive based on a composition according to the invention.

Such an adhesive is cured with the materials to be bonded in contact and typically at a temperature of 120° C.-220° C., preferably 150'-200° C.

Of course, in addition to heat-cured adhesives, sealants or coatings can also be prepared. Furthermore, the compositions according to the invention are not only suitable for automobile construction but are also suitable for other areas of application. Particularly obvious are related applications in construction of means of transportation such as ships, trucks, buses, or track vehicles, or in construction of consumer goods such as, for example, washing machines.

Hot-melt adhesives specifically can also be prepared on the basis of the composition according to the invention. Here the hydroxy groups in the epoxy adduct are reacted with isocyanate groups or isocyanate prepolymers. The viscosity is increased as a result, and application of heat is required.

Examples

A few examples are given below which illustrate the invention further but do not limit the scope of the invention in any way. The raw materials used in the examples are as follows:

| Raw materials used | Supplier |
|---|---|
| Dimerized C18 fatty acid (Pripol 1013) | Uniquema |
| Adipic acid | BASF |
| 2,2-Bis(4-hydroxyphenyl)propane | Fluka AG |
| Bis(4-hydroxyphenyl)sulfone | Fluka AG |
| Bisphenol-A diglycidyl ether (=DGEBA) | Vantico |
| Polypropylene glycol diglycidyl ether (ED-506) | Asahi-Denka Kogyo |
| Dicyanodiamide (=Dicy) | Degussa |
| Polypropylene ether polyol ($M_W$ = 2000 g/mol) | Bayer |
| Isophorone diisocyanate (=IPDI) | Degussa-Hüls |
| Caprolactam | EMS Chemie |
| N-Butylamine | BASF |
| 4,4'-Diphenylmethylene diisocyanate (=MDI) | Bayer |
| Core/shell polymer (F-351) | Zeon |
| Triphenylphosphine | Fluka |
| Dibutyltin dilaurate | Witco Europe |

General preparation for preparing epoxy adduct B and its mixture with A (=A/B premix):

A/B Premix PM1

Under vacuum and with stirring at 110° C., 123.9 g of a dimeric fatty acid, 1.1 g triphenylphosphine, and 57.3 g adipic acid were reacted for 5 hours with 658 g of liquid DGEBA epoxy resin, with epoxy content of 5.45 eq/kg, until a constant epoxy concentration of 2.85 eq/kg was achieved. After the end of the reaction, an additional 118.2 g of liquid DGEBA epoxy resin was added to the reaction mixture.

Then other mixtures PM2 to PM4 were prepared. For this purpose, the adipic acid was replaced by various aromatic alcohols in such a way that a theoretically identical epoxy content of 2.80-2.95 eq/kg was achieved in the binder:

A/B Premix PM2

Under vacuum and with stirring at 110° C., 123.9 g of a dimeric fatty acid, 1.1 g triphenylphosphine, and 95.0 g 2,2-bis(4-hydroxyphenyl)propane (=bisphenol-A) were reacted for 5 hours with 658 g of liquid DGEBA epoxy resin with epoxy content of 5.45 eq/kg, until a constant epoxy concentration of 2.95 eq/kg was achieved. After the end of the reaction, an additional 118.2 g of liquid DGEBA epoxy resin was added to the reaction mixture.

A/B Premix PM3

Under vacuum and with stirring at 110° C., 123.9 g of a dimeric fatty acid and 28.3 g adipic acid, 1.1 g triphenylphosphine, and 47.3 g bis(4-hydroxyphenyl)sulfone were reacted for 5 hours with 658 g of liquid DGEBA epoxy resin with epoxy content of 5.45 eq/kg, until a constant epoxy concentration of 2.85 eq/kg was achieved. After the end of the reaction, an additional 118.2 g of liquid DGEBA epoxy resin was added to the reaction mixture.

A/B Premix PM4

Under vacuum and with stirring at 110° C., 123.9 g of a dimeric fatty acid, 1.1 g triphenylphosphine, and 71.3 g bis(4-hydroxyphenyl)sulfone were reacted for 5 hours with 658 g of liquid DGEBA epoxy resin with epoxy content of 5.45 eq/kg, until a constant epoxy concentration of 2.82 eq/kg was achieved. After the end of the reaction, an additional 118.2 g of liquid DGEBA epoxy resin was added to the reaction mixture.

Thixotropic Agent C

The thixotropic agent C was prepared as specified in patent application EP 1 152 019 A1 in a blocked prepolymer with the above-mentioned raw materials:

Carrier: Blocked Polyurethane Prepolymer:

Under vacuum and with stirring at 90° C. in the presence of 0.08 g dibutyltin dilaurate, 600.0 g of a polyether polyol (2000 g/mol; OH-number, 57 mg/g KOH) was reacted with 140.0 g IPDI to form the isocyanate-terminated prepolymer, until the isocyanate content remained constant. Then the free isocyanate groups were blocked with caprolactam (2% excess).

Urea derivative (UD1) in Blocked Polyurethane Prepolymer:

Under nitrogen and with gentle heating, 68.7 g MD1 flakes were melted in 181.3 g of the blocked prepolymer described above. Then 40.1 g N-butylamine dissolved in 219.9 g of the blocked prepolymer described above was added dropwise over a two-hour period, under nitrogen and with rapid stirring. After addition of the amine solution was complete, the white paste was stirred for another 30 minutes. Then after cooling down, a soft white paste was obtained which had a free isocyanate content of <0.1% (proportion of urea derivative, about 21%).

More carrier can be added to this mixture if needed. For example, another 4 g of carrier (=blocked prepolymer) was added for the Examples.

Adhesive Formulations

Various adhesive compositions were prepared as specified in Table 1. The adhesives were cured after application at 50° C. for 30 minutes in an oven at 180° C. All the tests were carried out only after cooling the adhesive down to room temperature.

Test Methods:

Glass Transition Temperature Tg (DIN EN ISO 6721-2/DIN EN 61006)

The test pieces with dimensions 50×10 mm were punched out of a 2 mm thick sheet of adhesive which had been cured for 30 minutes at 180° C. between two pieces of teflon film.

Measurement: Oscillation 1 Hz, temperature range −50° C. to +150° C., heating rate 2° K/Min. The glass transition temperature Tg was determined at the maximum of the mechanical loss factor (tangent δ) curve.

Tensile Shear Strength TSS (DIN EN 1465)

The test pieces were prepared with electrogalvanized steel (eloZn) with dimensions 100×25×0.8 mm, where the adhesion surface area was 25×10 mm with a layer thickness of 0.3 mm. It was cured for 30 min at 180° C. The pull rate was 10 mm/min.

Impact Peel (ISO 11343)

The test pieces were prepared with electrogalvanized steel (eloZn) with dimensions 90×25×0.8 mm, where the adhesion surface area was 25×30 mm with a layer thickness of 0.3 mm. It was cured for 30 min at 180° C. The impact velocity was 2 m/s.

Results

The results of the adhesive formulations in Table 1 show that the combination of high impact strength, high glass transition temperature, and high strength can be achieved with the compositions according to the invention. Examples 1 and 7, which are not according to the invention, compared with Examples 2 and 6 show especially clearly the positive effect of the thixotropic agent, i.e., the urea derivative, on the impact strength. Examples 2 to 6 show the effect of the epoxy adduct used, so that both an increase in the impact strength and a rise in Tg can be realized at the same time by the invention, while the tensile shear strength remains unchanged. Examples 9 and 10, compared with Examples 2 and 6, show that the desired properties can be achieved regardless of whether the composition is filled or unfilled. Examples 8 and 6 show that the presence of a core/shell polymer has a positive effect on the impact strength, although the effect is less than for the thixotropic agent, i.e., the urea derivative.

TABLE 1

Examples of compositions and results

| | Example | | | | | | | | | |
|---|---|---|---|---|---|---|---|---|---|---|
| | 1 | 2 | 3 | 4 | 5 | 6 | 7 | 8 | 9 | 10 |
| Notes | Reference | | | | | | Reference | | unfilled | unfilled |
| A/B-PM1 [g] | 52.0 | 52.0 | — | — | 26.0 | — | — | — | 52.0 | — |
| A/B-PM2 [g] | — | — | 52.0 | — | — | — | — | — | — | — |
| A/B-PM3 [g] | — | — | — | 52.0 | — | — | — | — | — | — |
| A/B-PM4 [g] | — | — | — | — | 26.0 | 52.0 | 52.0 | 52.0 | — | 52.0 |
| ED-506 (G) [g] | 4.0 | 4.0 | 4.0 | 4.0 | 4.0 | 4.0 | 4.0 | 4.0 | 4.0 | 4.0 |
| UD1 [g] | — | 2.7 | 2.7 | 2.7 | 2.7 | 2.7 | — | 2.7 | 2.7 | 2.7 |
| Blocked prepolymer [g] | 15.0 | 15.0 | 15.0 | 15.0 | 15.0 | 15.0 | 15.0 | 15.0 | 15.0 | 15.0 |
| Dicy (D) [g] | 2.8 | 2.8 | 2.8 | 2.8 | 2.8 | 2.8 | 2.8 | 2.8 | 2.8 | 2.8 |
| Core/shell polymer (F351) (E) [g] | 6.5 | 6.5 | 6.5 | 6.5 | 6.5 | 6.5 | 6.5 | — | 6.5 | 6.5 |
| Filler mix (F)[g] | 17.0 | 17.0 | 17.0 | 17.0 | 17.0 | 17.0 | 17.0 | 17.0 | — | — |
| Tg [° C.] | 59.0 | 61.0 | 73.0 | 74.0 | 74.0 | 90.0 | 89.0 | 91.0 | 62.0 | 88.0 |
| Impact-Peel [kN] | 0.25 | 0.46 | 0.42 | 0.54 | 0.53 | 0.58 | 0.36 | 0.52 | 0.47 | 0.52 |
| Tensile shear strength [MPa] | 21.4 | 21.3 | 21.3 | 21.4 | 21.3 | 21.9 | 21.0 | 21.3 | 21.6 | 22.1 |

What is claimed is:

1. A composition comprising:
    at least one epoxy resin A with more than one epoxy group per molecule on the average;
    at least one epoxy adduct B, each with more than one epoxy group per molecule on the average, the epoxy adduct B comprising:
        an epoxy adduct B1, which is obtained from at least one dimeric C4-C20 fatty acid and at least one diglycidyl ether; and
        an optional epoxy adduct B2, which is obtained from at least one bis(aminophenyl)sulfone isomer or at least one aromatic alcohol and at least one diglycidyl ether;
    at least one thixotropic agent C, based on a urea derivative in a non-diffusing carrier; and
    at least one curing agent D for epoxy resins which is activated by elevated temperature.

2. The composition as in claim 1, wherein the epoxy resin A is a liquid.

3. The composition as in claim 1, wherein the diglycidyl ether for the epoxy adduct B1 is selected from the group consisting of bisphenol-A diglycidyl ether, bisphenol-F diglycidyl ether, and bisphenol-A/F diglycidyl ether.

4. The composition as in claim 1, wherein:
    the aromatic alcohol for the epoxy adduct B2 is selected from the group consisting of 2,2-bis(4-hydroxyphenyl)propane, bis(4-hydroxyphenyl)methane, bis(4-hydroxyphenyl)sulfone, hydroquinone, resorcinol, pyrocatechol, naphthohydroquinone, naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, and all isomers of the aforementioned compounds; and
    the diglycidyl ether for the epoxy adduct B2 is selected from the group consisting of bisphenol-A diglycidyl ether, bisphenol-F diglycidyl ether, and bisphenol-A/F diglycidyl ether.

5. The composition as in claim 1, wherein the epoxy adduct B has a molecular weight of 700-6000 g/mol.

6. The composition as in claim 1, wherein the carrier for the thixotropic agent C is a blocked polyurethane prepolymer.

7. The composition as in claim 6, wherein the urea derivative in the thixotropic agent C is the product of a reaction between an aromatic monomeric diisocyanate and an aliphatic amine compound.

8. The composition as in claim 1, wherein the curing agent D is a latent curing agent selected from the group consisting of dicyandiamide, guanamine, guanidine, and aminoguanidine.

9. The composition as in claim 1, wherein the total proportion of epoxy resin A and epoxy adduct B together is 20-70 wt. % based on the weight of the total composition.

10. The composition as in claim 1, wherein the total proportion of epoxy resin A is 12-50 wt. % based on the sum of the weights for A+B.

11. The composition as in claim 1, wherein the total proportion of the thixotropic agent C is 5-40 wt. % based on the weight of the total composition.

12. The composition as in claim 11, wherein the proportion of the urea derivative is 5-50 wt. % based on the weight of the thixotropic agent C.

13. The composition as in claim 1, wherein the total proportion of the curing agent D is 1-6 wt. % based on the weight of the total composition.

14. The composition as in claim 1, further comprising at least one core/shell polymer E is present.

15. The composition as in claim 14, wherein the total proportion of the core/shell polymer E is 3-20 wt. % based on the weight of the total composition.

16. The composition as in claim 1, wherein the core of the core/shell polymer E consists of a polymer with a glass transition temperature of −30° C. or lower, and the shell of the core/shell polymer E consists of a polymer with a glass transition temperature of 70° C. or higher.

17. The composition as in claim 1, further comprising at least one filler F.

18. The composition as in claim 17, wherein that the total proportion of the filler F is 5-30 wt. % based on the weight of the total composition.

19. The composition as in claim 1, further comprising at least one reactive diluent G with epoxy groups.

20. The composition as in claim 1, wherein the composition has a glass transition temperature of at least 85° C.

21. A process for preparing the composition as in claim 1, the process comprising:
forming the at least one epoxy adduct B2 by reacting at least one bis(aminophenyl)sulfone isomer or at least one aromatic alcohol with at least one diglycidyl ether; and
mixing the at least one epoxy resin A, the at least one epoxy adduct B1, the at least one thixotropic agent C, and the at least one curing agent D.

22. A one-component adhesive comprising the composition of claim 1.

23. The one-component adhesive as in claim 22, wherein that the adhesive bonds heat-stable materials.

24. An automobile construction bodyshell adhesive comprising the one-component adhesive of claim 22.

25. A method of increasing impact strength in a composition, the method comprising:
adding to the composition a thixotropic agent C, based on a urea derivative in a non-diffusing carrier;
wherein the composition comprises:
at least one epoxy resin A with more than one epoxy group per molecule on the average;
at least one epoxy adduct B, each with more than one epoxy group per molecule on the average; average, the epoxy adduct B comprising:
an epoxy adduct B1, which is obtained from dimeric C4-C20 fatty acid and at least one diglycidyl ether; and
an optional epoxy adduct B2, which is obtained from at least one bis(aminophenyl)sulfone isomer or at least one aromatic alcohol and at least one diglycidyl ether; and
at least one curing agent D for epoxy resins which is activated by elevated temperature.

26. The method of claim 25, wherein that the carrier is a blocked polyurethane prepolymer.

27. The method of claim 25, wherein that the urea derivative is the product of a reaction between an aromatic monomeric diisocyanate and an aliphatic amine compound.

28. The method of claim 25, wherein the proportion of the urea derivative is 5-50 wt. % based on the weight of the thixotropic agent C.

29. A process for bonding heat-stable materials, the process comprising:
contacting at least a first heat-stable material and a second heat-stable material with the composition as in claim 1; and
curing at a temperature of 120° C.-220° C.

* * * * *